US005983245A

United States Patent [19]
Newman et al.

[11] Patent Number: 5,983,245
[45] Date of Patent: Nov. 9, 1999

[54] METHOD AND APPARATUS FOR IMPLEMENTING UNIVERSAL RESOURCE LOCATOR MENUS

[75] Inventors: Steve Newman; Sam Schillace, both of Palo Alto, Calif.

[73] Assignee: Apple Computer, Inc., Cupertino, Calif.

[21] Appl. No.: 08/777,223

[22] Filed: Dec. 27, 1996

[51] Int. Cl.$^6$ .................................................. G06F 17/22
[52] U.S. Cl. .......................... 707/513; 707/501; 707/530
[58] Field of Search .................................. 707/501, 512, 707/513, 514, 10, 104, 530; 345/326, 329, 335, 339, 348, 352, 353, 356

[56] References Cited

U.S. PATENT DOCUMENTS

| 5,724,595 | 3/1998 | Gentner ..................................... 707/501 |
| 5,727,156 | 3/1998 | Herr-Hoyman et al. .......... 395/200.49 |
| 5,758,351 | 5/1998 | Gibson et al. ........................... 707/104 |
| 5,787,435 | 7/1998 | Burrows .................................. 707/102 |
| 5,802,299 | 9/1998 | Logan et al. ....................... 395/200.48 |
| 5,802,530 | 9/1998 | Hoff ....................................... 707/513 |

OTHER PUBLICATIONS

Sharon Terdeman, "Web Authoring ," PC Magazine Online, WWW.PCMAG.COM, Sep. 10, 1996, pp. 116–164.

Lemay, Laura *Lemay's Web Workshop: Microsoft FrontPage97*, Sam. net, 1997, pp. 153–168.

Senna, "Web site authoring software Lots of extras in FrontPage 97", from http://www.infoworld.com/cgi–bin/display Archives. p1?dt_iwe41–96_80.htm, pp. 1–3, Oct. 7, 1996.

Simpson, *Mastering WordPerfect 5.1&5.2 for Windows*, Sybex Inc., 1993, pp. 10.

*Primary Examiner*—Stephen S. Hong
*Attorney, Agent, or Firm*—Beyer & Weaver, LLP

[57] ABSTRACT

Disclosed is a method for generating universal resource locator links in a graphical user interface based HTML file. The method includes the operations of selecting one of a picture object and text contained within the graphical user interface based HTML file. Once one of the picture object and text are selected, a short-cut universal resource locator icon is selected. Upon selecting the short-cut universal resource locator icon, a nested menu is displayed. Preferably, the nested menu contains a list of most recently used universal resource locators, and a list of open HTML files. Next, one of the universal resource locators is selected from the list of most recently used universal resource locators and the open HTML file from the list of open HTML files. Once selected, a link is generated from the selected one of the picture object and text contained within the graphical user interface based HTML file to one of the selected universal resource locators from the list of most recently used universal resource locators and the open HTML file.

18 Claims, 12 Drawing Sheets

METHOD AND APPARATUS FOR IMPLEMENTING UNIVERSAL RESOURCE LOCATOR MENUS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights.

BACKGROUND OF THE INVENTION

1. Field of the Invention

The present invention relates generally to universal resource locator links, and more particularly, to methods and apparatuses for generating universal resource locator links through a computer graphical user interface linking editor.

2. Description of the Related Art

Due to the increased popularity of the internet (also known as the world wide web), using the internet has nearly become a necessity for many segments of the population. Accordingly, developers of internet computer software have been racing to make their products less complicated and easier to use. By way of example, many new internet products implement easy-to-use graphical user interfaces that simplify a user's task of navigating around networks like the world wide web and local area networks (LANs). In response to the internet's increased popularity, a larger number of individuals and businesses now have "web sites" posted on internet servers. As is well known in the art, internet servers are large scale computers connected to the world wide web and regularly maintained by service providers.

While establishing an internet presence for many businesses was important, most business typically contracted with experts to create their web sites and maintain them. Experts were generally used because most internet users did not understand, nor had the time to learn HTML programming. As is well known, HTML is a programming language that is generally used to create web sites that have text, graphics and pictures. Thus, to program in HTML, a person would need to understand numerous special codes and characters used for illustrating text, graphics, tables, pictures, and links within a web site file.

To meet consumer demand, many software developers introduced software packages that allowed people having little or no knowledge of HTML programming to create web sites. These packages generally implement graphical user interfaces that allowed users to type in text, create graphics and create links without generating the HTML code from scratch. Therefore, these packages implement software algorithms for converting the graphical user interface commands into appropriate HTML code. Of course, the HTML code was still being generated by the software algorithms without the knowledge of the user.

FIG. 1 is an exemplary block diagram of a web site having a number of related files that make up a web site. As shown, there is a "Home Web Site Page" which may be the initial page in a web site. Further, as is well known in the art, the various HTML files may be linked to one another through the use of universal resource locator (URL) links. In addition to linking to a particular file in general, users may also link to selected portions of an HTML file by linking to an "anchor," that was previously defined within the HTML file. By way of example, file2.html, file3.html and file6.html all have previously defined anchors that may be used by any of the web site files (or internet files) to quickly reference specific parts of an HTML file containing anchors. In this example, file 1.html is shown being linked to anchors A, B, C and D, and all other files in the web site are shown linked back to file1.html, which is the Home Web Site Page.

Although having links between files and anchors is an efficient way to interconnect web site files and anchors, most well known web site creating packages make generating links laborious and clumsy. By way of example, each time a link is needed, users are generally required to call up a modal dialog from a menu bar (e.g., typically includes a list of functional pull-down menus) which subsequently displays to user a multiplicity of selection options. In some cases, the selection options are so complex that a user is required to perform numerous mechanical mouse clicks before a single link is created. As can be appreciated, the task of creating links for an entire web site can be very time consuming and confusing. In addition, due to the nature of modal dialogs, the user is generally required to complete the entire link configuration before the user is allowed to continue working on the web site files.

Another time consuming task is the typing in of URL's. As is well known to those skilled in web site building, many of the URL's used during the creation of a web site are quite long. In some cases, URL's may be a paragraph long. Certainly, the task of constantly re-typing the same URL for different locations of a file, or to link a web site's files together can be a very daunting and time consuming task. As an example, FIG. 1 shows all of the files in the web site having a link (i.e., Go Home) that takes a user that is navigating in each in the web site files back to the Home Web Site Page. Consequently, the web site creator is generally required to create a link at the bottom of each file using a conventional modal dialog, which unfortunately requires the user to constantly call up the modal dialog from the menu bar and re-type the identical URL.

In view of the foregoing, there is a needed for improved methods and apparatuses for generating universal resource locator links through a computer graphical user interface.

SUMMARY OF THE INVENTION

Broadly speaking, the present invention provides methods and apparatuses for efficiently generating universal resource locator links through a graphical user interface. It should be appreciated that the present invention can be implemented in numerous ways, including as a process, an apparatus, a system, a device, a method, or a computer readable medium. Several inventive embodiments of the present invention are described below.

In one embodiment, a method for generating universal resource locator links in a graphical user interface based HTML file is disclosed. The method includes the operations of selecting one of a picture object and text contained within the graphical user interface based HTML file. Once one of the picture object and text are selected, a short-cut universal resource locator icon is selected. Upon selecting the short-cut universal resource locator icon, a nested menu is displayed. Preferably, the nested menu contains a list of most recently used universal resource locators, and a list of open HTML files. The list of most recently used universal resource locators includes at least one universal resource locator, and the list of open HTML files that include at least one HTML file. Next, one of the universal resource locators is selected from the list of most recently used universal resource locators and the open HTML file from the list of open HTML files. Once selected, a link is generated from the selected one of the picture object and text contained within the graphical user interface based HTML file to one of the selected universal resource locators from the list of most recently used universal resource locators and the open HTML file from the list of open HTML files.

In another embodiment, a method for generating a cascaded graphical user interface menu is disclosed. The cascaded graphical user interface menu is preferably used for creating universal resource locator links. The method includes retrieving a list of most recently used universal resource locators from memory. Then, retrieving a list of active HTML files from memory. Next, a first menu data structure is created and entries are added to the first menu data structure for each universal resource locator in the list of most recently used universal resource locators. The method further adds entries to the first menu data structure for any open HTML files, and then displays the cascaded graphical user interface menu that is partitioned into a first portion and a second portion.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

An invention is described for efficiently generating universal resource locator links through a graphical user interface. In one embodiment, the graphical user interface utilized to generate the universal resource locator links is a floating link editor.

In the following description, numerous specific details are set forth in order to provide a thorough understanding of the present invention. It will be obvious, however, to one skilled in the art, that the present invention may be practiced without some or all of these specific details. In other instances, well known process operations have not been described in detail in order not to unnecessarily obscure the present invention.

The present invention discloses methods and apparatuses for generating universal resource locator links in a web site file by implementing a smart graphical user interface linking editor. In one embodiment, the smart graphical user interface linking editor is a floating link editor that remains active while web site files are being created. By way of example, the floating link editor preferably has a short-cut URL pop-up button (i.e., a functional icon) that, once selected, displays a cascaded menu. The cascaded menu is preferably divided into a first and second part. In the first part, a list of most recently used URL's is automatically maintained and updated while the user is editing a web site. The second part of the cascaded menu has a list of all of the web site files that are currently open. That is, "open files" means html files that are being created for use with one or more web sites.

Advantageously, having a list of the most recently used URLs and a list of the open web site files, the present invention makes creating links very efficient. As an example, once the floating link editor is open, the user may create a link from text in one file to any of the currently open files by performing a single mouse click. In a further embodiment, a user may also link to a particular anchor defined within one of the open files identified in the second part of the cascaded menu. Preferably, if an open file contains anchors, the anchors within that file will be displayed as a nested menu that may also be efficiently selected with one mouse click of the short-cut URL pop-up button.

Figure 2A:
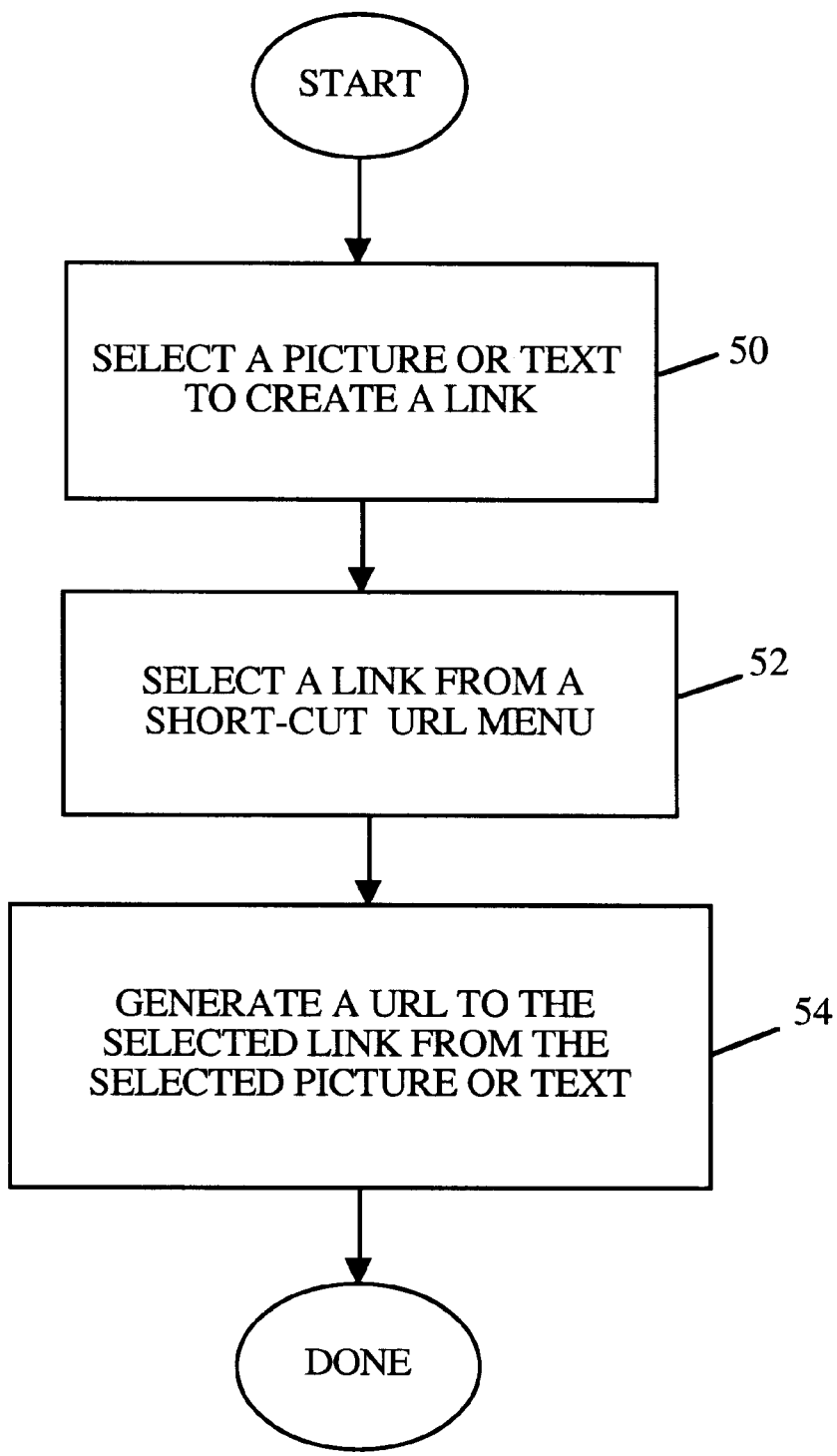
FIG. 2A is a flowchart diagram illustrating the method operations associated with generating a universal resource locator link in accordance with one embodiment of the present invention.

FIG. 2A is an overview flowchart diagram illustrating the method operations associated with selecting a link editor, implementing a short-cut URL pop-up button, and generating a universal resource locator link in accordance with one embodiment of the present invention. The method starts at an operation 50 where a picture or text is selected in order to create a link from a selected picture or text to a particular URL or open file. By way of example, in a typical web site file (i.e., web page), there may be a variety of different types of graphics and text characters distributed throughout a page. In order to create a link between one of the pictures or text characters on the web site file, a user must first select one of the various pictures or text to serve as a jump site. As is well know in the art, when text serves as a jump site, it is typically displayed with an underline, and in some cases, the text is colored blue.

Accordingly, once a picture or text has been selected to create a link in operation 50, the method proceeds to an operation 52 where a link from a floating link editor is selected by accessing a short-cut URL pop-up button. As described above, once the short-cut URL pop-up button is selected from the floating link editor, a cascaded menu is present to the user. After a link is selected from the cascaded menu, the previously selected picture or text will be automatically linked to the selected link (i.e., the URL will automatically be created). As will be described in greater detail below, the short-cut URL address pop-up button contained within the floating link editor provides a very efficient manner for creating URL addresses without having to manually type in the URL each time it is needed.

As is well known in the art, floating-type windows allow users to access functional icons while advantageously allowing a user to continue working on the various files of a web site. This flexibility is especially useful to users that create numerous links within a local web site and to lengthy internet URL links. In addition, the cascaded menu provided by selecting the short-cut URL pop-up button further reduces the laborious task of re-typing URLs that are lengthy and frequently used. This is because the list of frequently used URLs that lie within a first portion of the cascaded menu is constantly and automatically being updated each time a new URL is implemented in the web site.

Once a link has been selected using the shortcut menu in operation 52, the method proceeds to a operation 54 where a URL link is generated from the selected picture or text to the link selected in the cascaded menu provided by the short-cut URL pop-up button of operation 52. The method operations associated with generating a URL link are preferably carried out by a computer as described in grater detail in FIG. 2D below. Once the URL link is generated in operation 54, the method is done.

Figure 2B:
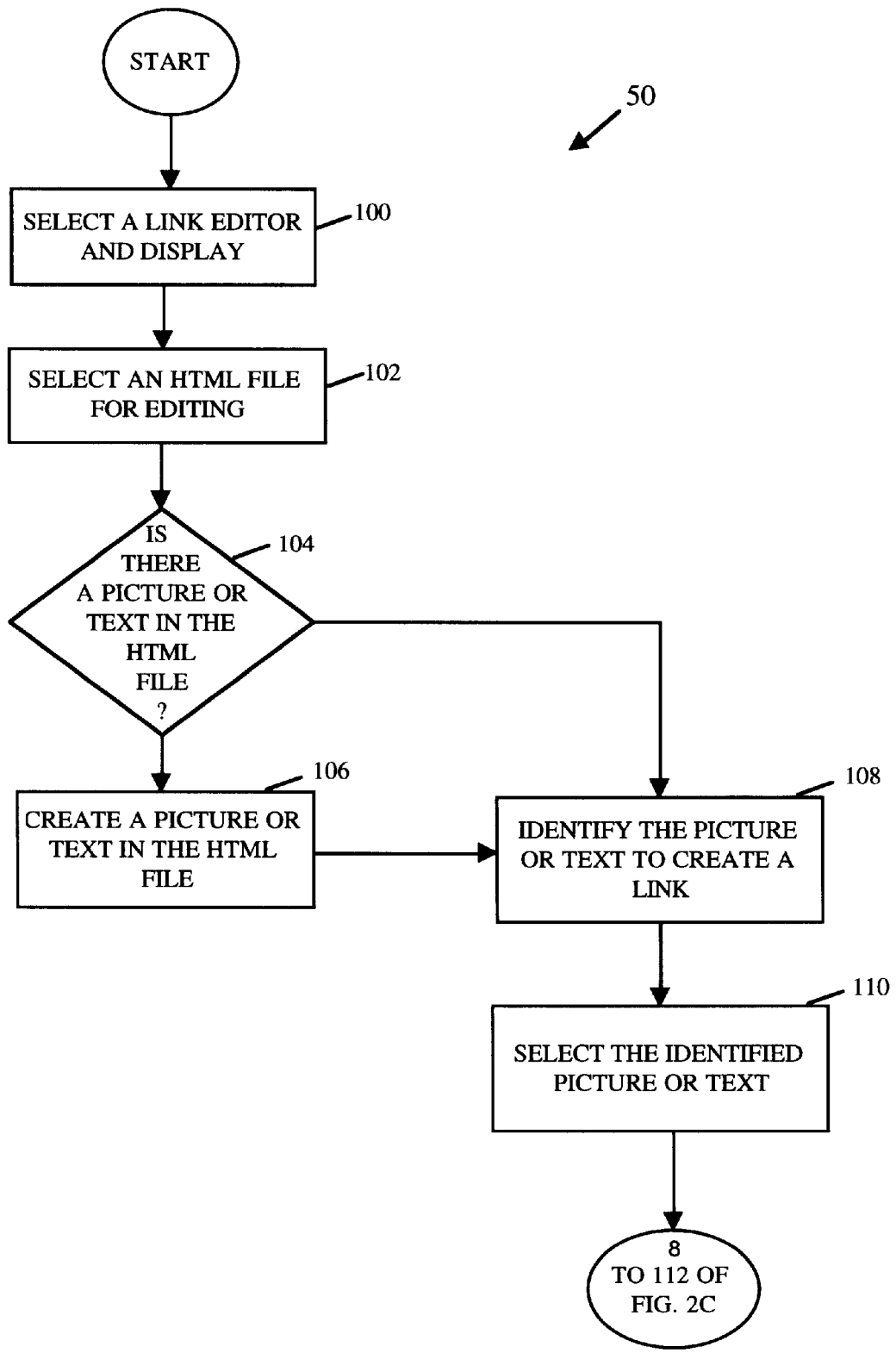
FIG. 2B is a more detailed flowchart diagram illustrating the operations associated with generating a link from a selected picture or text to a selected URL in accordance with one embodiment of the present invention

FIG. 2B is a more detailed flowchart diagram illustrating the operations associated with generating a link from a selected picture or text to a selected URL in accordance with one embodiment of the present invention. The method starts at an operation 100 where a link editor is selected from a menu bar which is typically provided at a topmost region of a computer screen. By way of example, the link editor will preferably be located in a pull-down menu entitled "window". Once pull-down menu window is activated, the user may select an option entitled "show link editor." Once the show link editor option is selected, a floating link editor is displayed to the user. As is well known in the art, floating windows are also referred to as "palettes" which generally remain open and active while the user performs edits to an HTML file. Of course, any other suitable way for accessing the floating link editor may also be implemented. Suitable alternatives may include using an functional icon that calls up the floating link editor or a short cut key-stroke.

Figure 1:
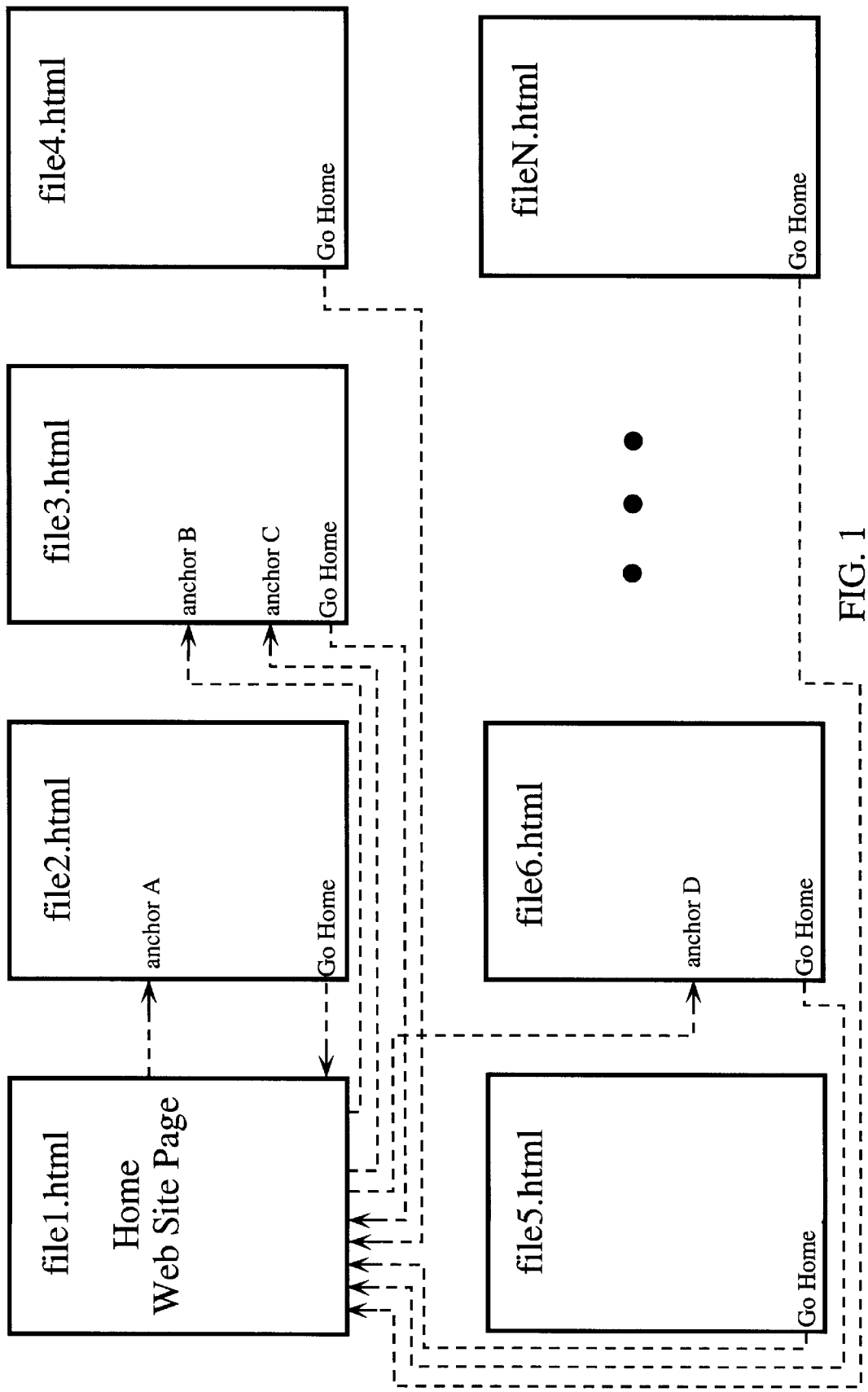
FIG. 1 is an exemplary block diagram of a web side having a number of related files.

After the link editor has been selected and a floating link editor is displayed in operation 100, the method proceeds to an operation 102 where an HTML file is selected for editing. By way of example, an HTML file may be "file 1.html" which is, in the exemplary web site of FIG. 1, the Home Web Site Page. Once an HTML file has been selected for editing in operation 102, the method proceeds to a decision operation 104 where it is determined whether there is a picture or text in the HTML file selected in operation 102. It should be understood that a picture may be a graphical box, a scanned in photograph, or any type of image or graphic that may be created using a graphics software package or other suitable software package.

If it is determined in operation 104 that there are no pictures nor text in the HTML file, the method will proceed to an operation 106 where a user may input a picture or text into the HTML file using suitable text editing and graphics tools. In one embodiment, the text editing and graphics tools may be provided as part of an HTML web page creation program. However, graphics created using other software products may also be incorporated into an HTML file (e.g., by drag-and-drop, and cut/copy-and-paste). Once the user has input a picture or text into the HTML file selected in operation 102,the method will proceed to an operation 108 where the picture or text contained within the HTML file is identified to create a link.

On the other hand, if it is determined in operation 104 that there already is a picture or text in the HTML file selected in operation 102, the method would also proceed to operation 108 where the picture or text contained within the HTML file is identified to create a link. After the picture or text is identified in operation 108, the method will proceed to an operation 110 where the identified picture or text is selected. In one embodiment, selection may be appropriately performed by clicking on a mouse once a GUI selection pointer has been placed over the identified picture or text as described above. Of course, other selection methods may also be used. By way of example, the user may implement a touch screen pen or simply use a computer keyboard to perform an appropriate selection. At this point, the operation of selecting a picture or text to create a link is complete, and the method proceeds to an operation 112 of FIG. 2C.

Figure 2C:
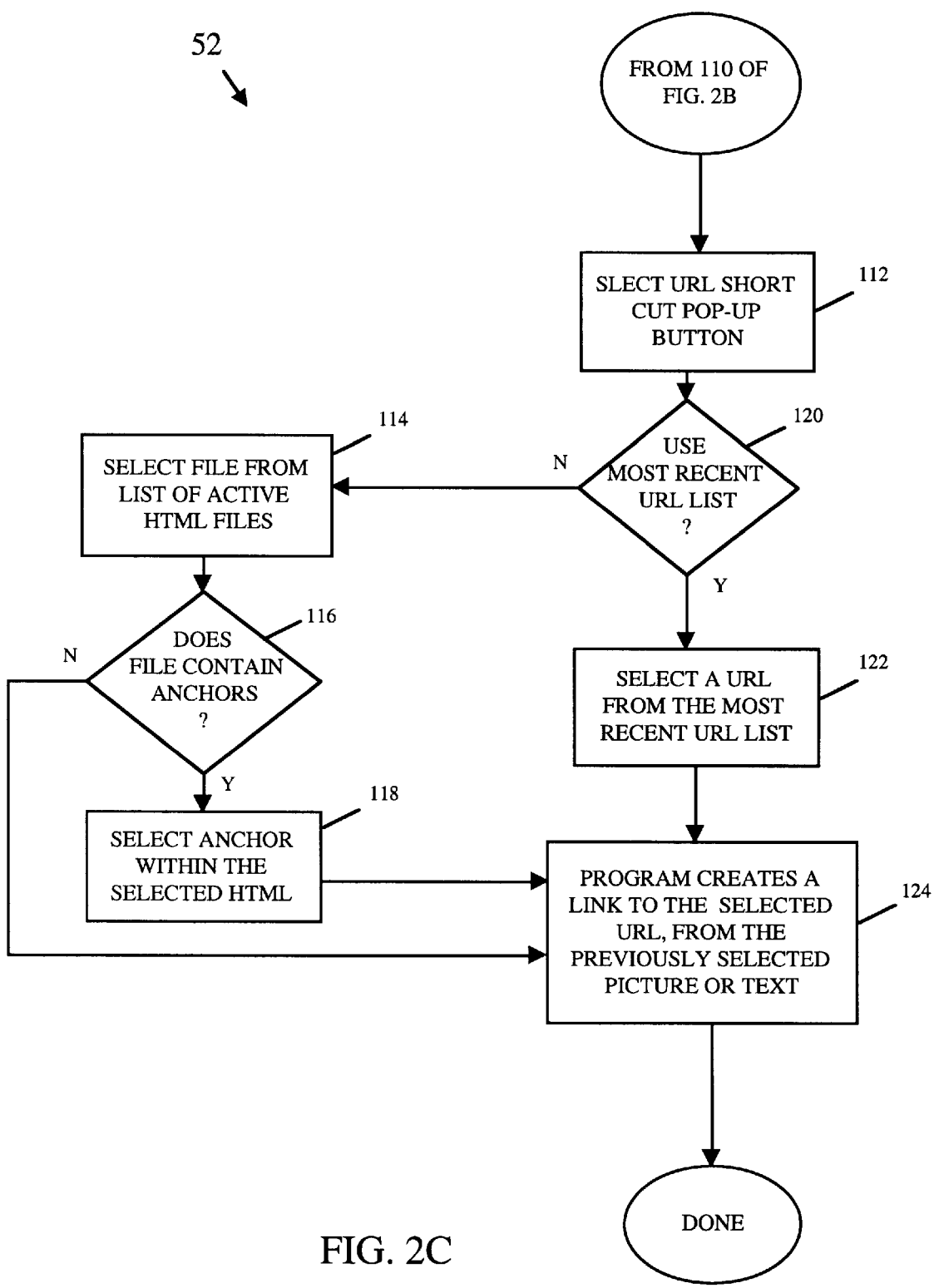
FIG. 2C is a more detailed flowchart diagram illustrating the operations associated with selecting a URL link from a cascaded menu in accordance with one embodiment of the present invention.

FIG. 2C is a more detailed flowchart illustrating the operations associated with selecting a URL link from a cascaded menu provided from a short-cut URL pop-up button in accordance with one embodiment of the present invention. In operation 112, a user may select a URL shortcut pop-up button in accordance with one embodiment of the present invention. Preferably, the URL shortcut pop-up button will be illustrated as a graphical user interface selection icon on a floating link editor as described above. Once the shortcut pop-up button has been selected, a cascaded menu will preferably be displayed in a nested format for the user's selection.

By way of example, the user will preferably be presented with an option of selecting a URL from a list of most recently used URLs, or a file from a list of open HTML files that may be associated with a current web site. As described with reference to FIG. 1, a web site may include one or more related HTML files that may be open while a web site is being created and edited. Further, the various HTML files may be linked together, e.g., from underlined text characters in a current HTML file to the "top of a page" of another selected HTML file. Of course, if a selected HTML file has a previously defined anchor, a user may also choose to link to a specific anchor within a selected HTML file.

Once the shortcut URL pop-up button has been selected in operation 112, the method will proceed to a decision operation 120 where it is determined whether a most recent URL link is selected from the list of most recently used URLs. If it is determined that the user does not select a most recently used URL link from the URL list, the method will proceed to an operation 114 where a file from the list of active HTML files is selected. As described above, an active HTML file will preferably be an HTML file that is currently open and a user is able to edit and create text, pictures and links.

After an active HTML file is selected in operation 114, the method will proceed to a decision operation 116 where it is determined whether the selected file contains anchors. As described above, an anchor is typically used for linking to selected portions within an HTML file. In one embodiment, an anchor may also be used within the same HTML file to link a user from one part of a lengthy file to another.

If the HTML file selected in operation 114 does contain anchors, the method will proceed from operation 116 to an operation 118 where an anchor may be selected within the HTML file. On the other hand, if the file does not contain anchors, the method will proceed directly to an operation 124 where a program automatically creates a link to a selected URL associated with the selected HTML file back to the selected picture or text identified in operation 108. It should be appreciate that the program itself creates the URL address itself, e.g., without having to manually type it in.

Referring back to operation 120, if the user does use a most recent URL from the URL list, the method will proceed to an operation 122. In operation 122, a user may select a URL from the most recently used URL list. In one embodiment, the most recent URL list preferably contains 10 most recent URLs. However, it should be obvious that any suitable number of URLs may be used depending on a user's requirements. Once a URL is selected from the most recent URL list in operation 122, the method will then proceed to operation 124 where the program again establishes a link from the URL selected from the most recent URL list to the selected picture or text identified in operation 108.

Figure 2D:
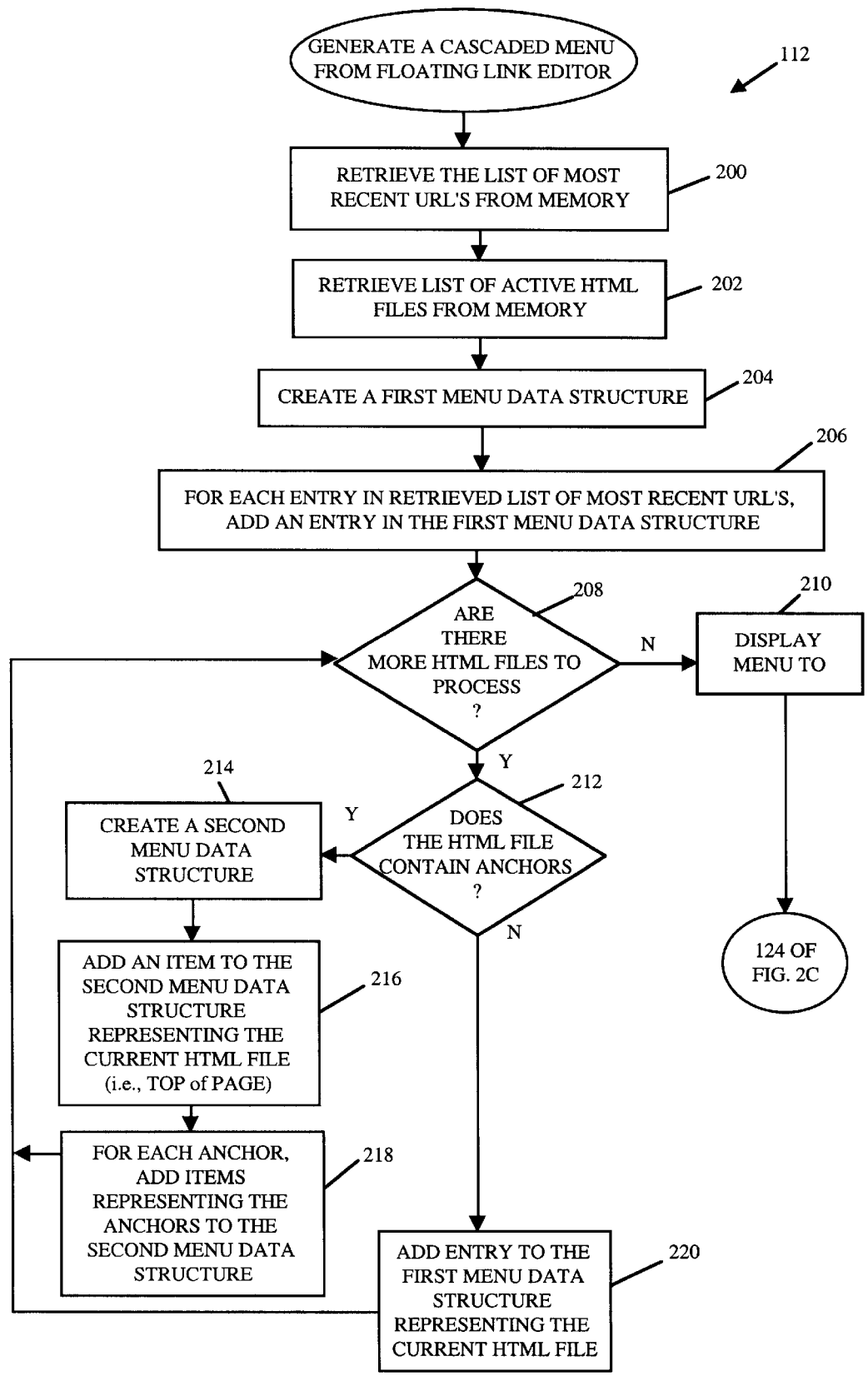
FIG. 2D is a more detailed flowchart diagram of the operations carried out by a computer in accordance with one embodiment of the present invention.

FIG. 2D is a more detailed flowchart diagram of the operations carried out by a computer in operation 112 of FIG. 2B to generate a cascaded menu from a floating link editor in accordance with one embodiment of the present invention. The method begins at an operation 200 where a list of the most recently used URLs are retrieved from memory. In one embodiment, memory may be suitable random access memory (RAM). Once the list of most recently used URLs have been retrieved from memory, the method will proceed to an operation 202. In operation 202, a list of active HTML files are retrieved from memory in a suitable manner as described with reference to operation 200.

The method now proceeds to an operation 204 where a first menu data structure is created. After the first menu data structure is created, the method proceeds to an operation 206 where, for each entry in the retrieved list of most recently used URLs, an entry in the first menu data structure is added. Once the first menu data structure contains, as entries, the list of most recently used URLs, the method will proceed to a decision operation 208 where it is determined whether there are anymore HTML files to process.

If it is determined that there are more HTML files to process, the method will proceed to another decision operation 212 where it is determined whether a current HTML file contains anchors. If it is determined that the current file does not contain anchors, the method will proceed to an operation 220 where an entry representing the current HTML file is added to the first menu data structure. One the other hand, if it is determined in operation 212 that the current HTML file does anchors, the method will proceed to an operation 214 where a second menu data structure is created.

In one embodiment, the second menu data structure will be a subordinate data structure to the first menu data structure which, may be displayed within a cascaded menu as described above. After the second menu data structure is created in operation 214, the method proceeds to an operation 216 where an item representing the current HTML file is added to the second menu data structure. By way of example, the item representing the current HTML file will preferably be a designation to the "top of page" of the current HTML file as will be illustrated in FIG. 6.

The method now proceeds to an operation 218 where for each anchor contained within the current HTML file, an entry is added to the second menu data structure. Once an entry has been added to the second menu data structure for each anchor in operation 218, the method will again proceed to decision operation 208 where it is again determined whether there are anymore HTML files to process. If there are more HTML files to process, the method will continue to loop through operations 212, 214, 216, 218, 220, and again back to operation 208 for each HTML file that is open in a particular web site. By way of example, if the web site included the open HTML files shown in FIG. 1, the process would proceed through the aforementioned loop for each of the open HTML files. Of course, because file1.html, file4.html, file5.html, and fileN.html are shown having no anchors, the method would preferably not loop through operations 214, 216 and 218.

Once it is determined that there are no more open HTML files to process in operation 208, the method will proceed to an operation 210 where a cascaded nested menu is displayed to the user. As is well known in the art, displaying the menu in a cascaded nested format is a general operating system function which incorporates the first and second menu data structures as part of the displayed cascaded nested menus. At this point, the method proceeds to operation 124 of FIG. 2B where the program creates a link from one of a selected most recent URL, or open HTML file that may have an associated anchor, to a previously selected picture or text.

Figure 3:
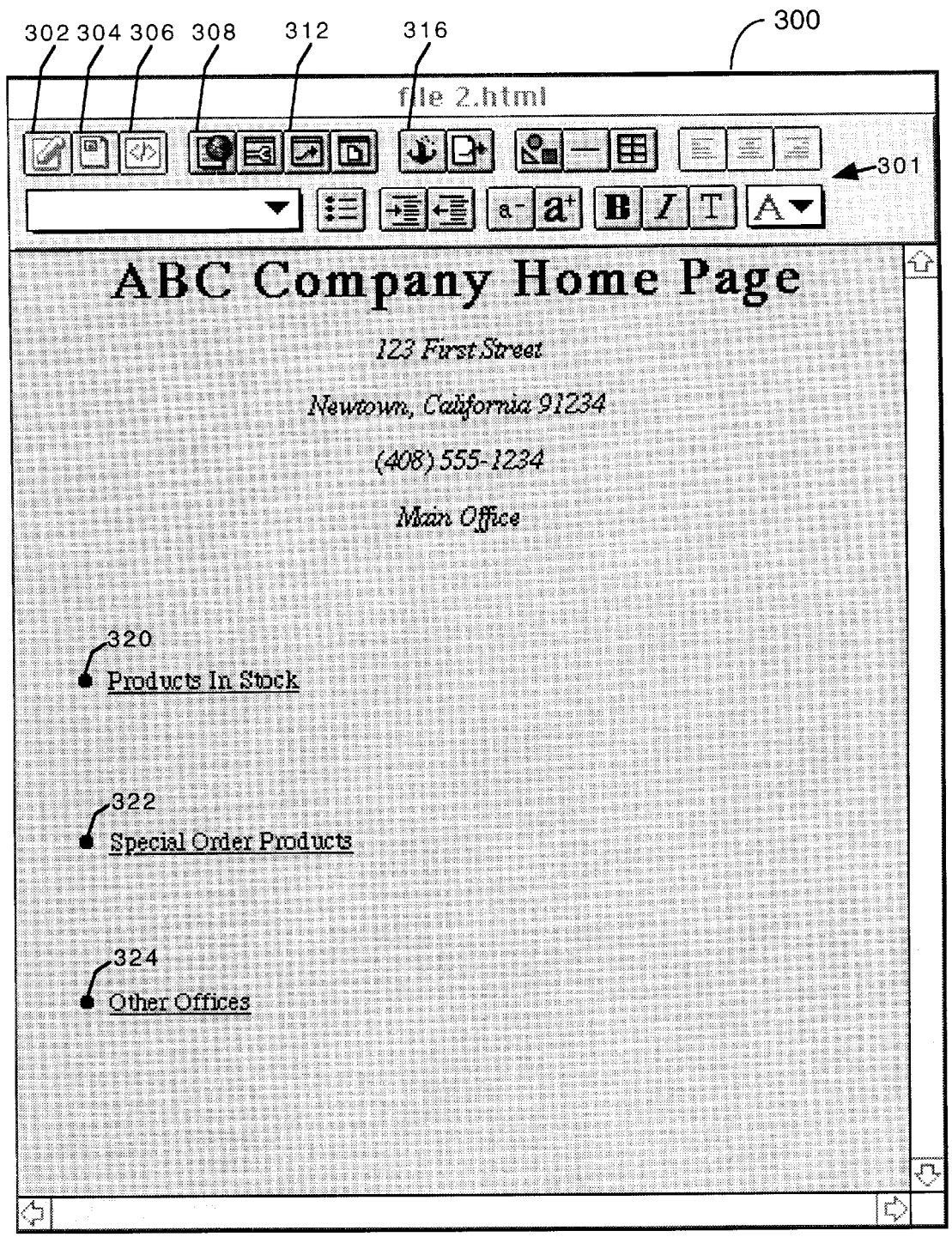
FIG. 3 is an exemplary screen shot of an HTML file in accordance with one embodiment of the present invention.

FIG. 3 is an exemplary screen shot of a file 2.html 300 in accordance with one embodiment of the present invention. In this example, file 2.html 300 may represent the home page of ABC Company's web site. As shown, ABC Company has an address of "123 First Street, Newtown, Calif. 91234," which is designated as their main office. Further, ABC Company has generated links from their home page to other HTML files in their web site. By way of example, ABC company has created jump sites (e.g., links) at "products in stock" 320, special order products 322, and other offices 324. In this manner, if a user selects that particular text, a link will be activated to another location. Although the jump sites are illustrated as underlined text, jump sites may also be made from pictures and graphics as described above.

As clearly illustrated, file 2.html 300 also contains a variety of suitable editing tools 301 that may be used to create and edit various portions of ABC Company's home page. By way of example, a button icon 302 represents an "edit page mode" which may be selected when portions of ABC Company's home page are being created, edited, updated or revised.

Figure 8:
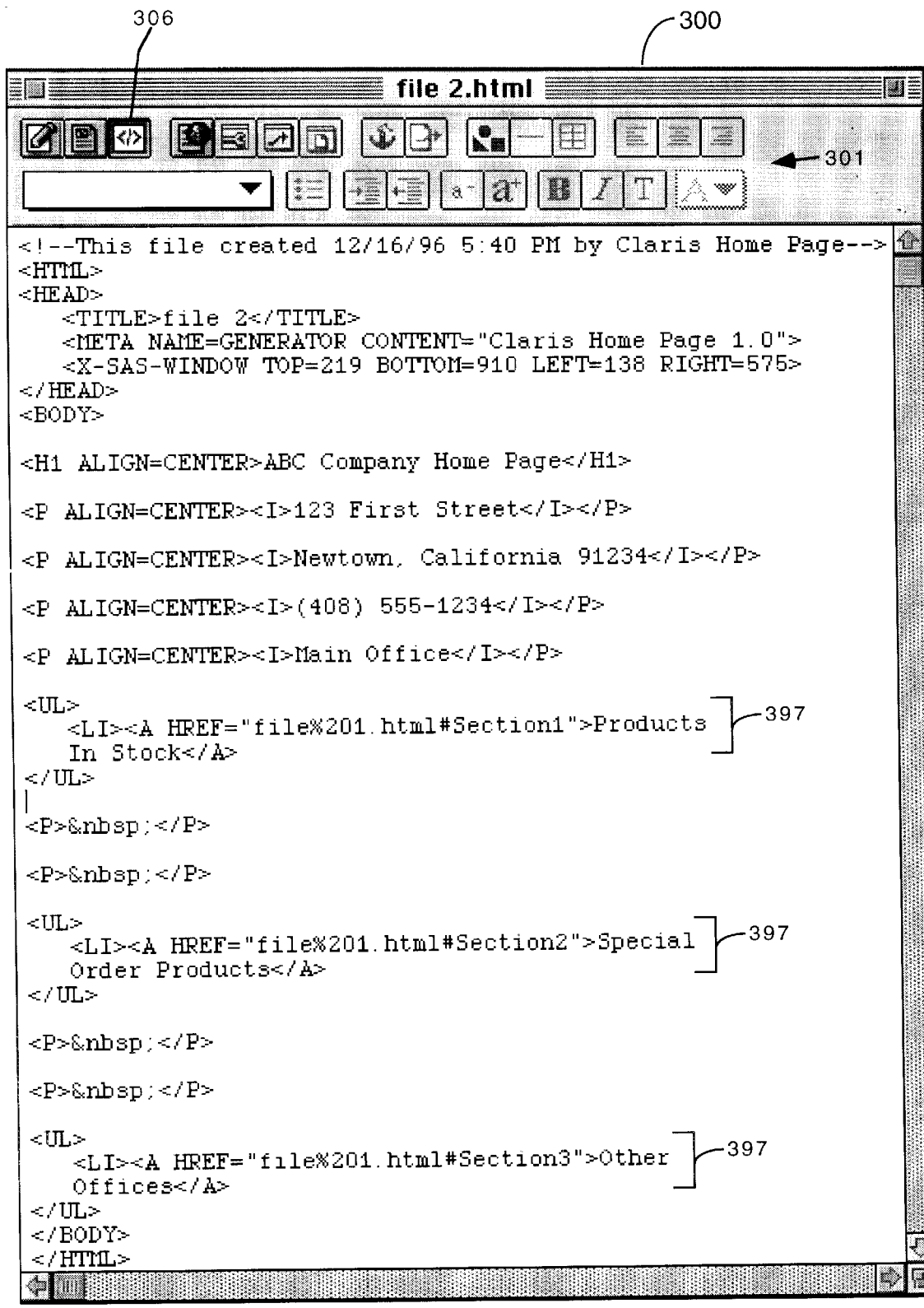
FIG. 8 shows an HTML file displayed in edit html source code mode in accordance with one embodiment of the present invention.

A "preview page mode" button icon 304 is also provided to preview an HTML file as well as the functional links generated in accordance with one embodiment of the present invention. An "edit html source code" button icon 306 is also provided to allow a user to view and edit the HTML code parameters. By way of example, if the user understands HTML code, the edit html source code button icon 306 will advantageously allow the user to add or modify features of an HTML file. An exemplary HTML source code file for file2.html 300 is shown in FIG. 8 below.

A "preview browser mode" button icon 308 is a functional feature that allows a user to preview their newly created web page or site over the internet. By way of example, if the newly created web page has links to the world wide web, these links may be previewed to determine whether they are appropriately set. A "link editor" icon button 312 is shown as a graphical user interface button icon, which may be selected to quickly display the aforementioned floating link editor in accordance with one embodiment of the present invention. Of course, the floating link editor may also be called-up from the menu bar/pull down menu as described above. Finally, an "anchor creation mode" icon button 316 may be used to set and define anchors within an HTML file. By way of example, once a text or picture has been selected, the user may then select icon button 316 to define the selected text or picture as an anchor.

Figure 4:
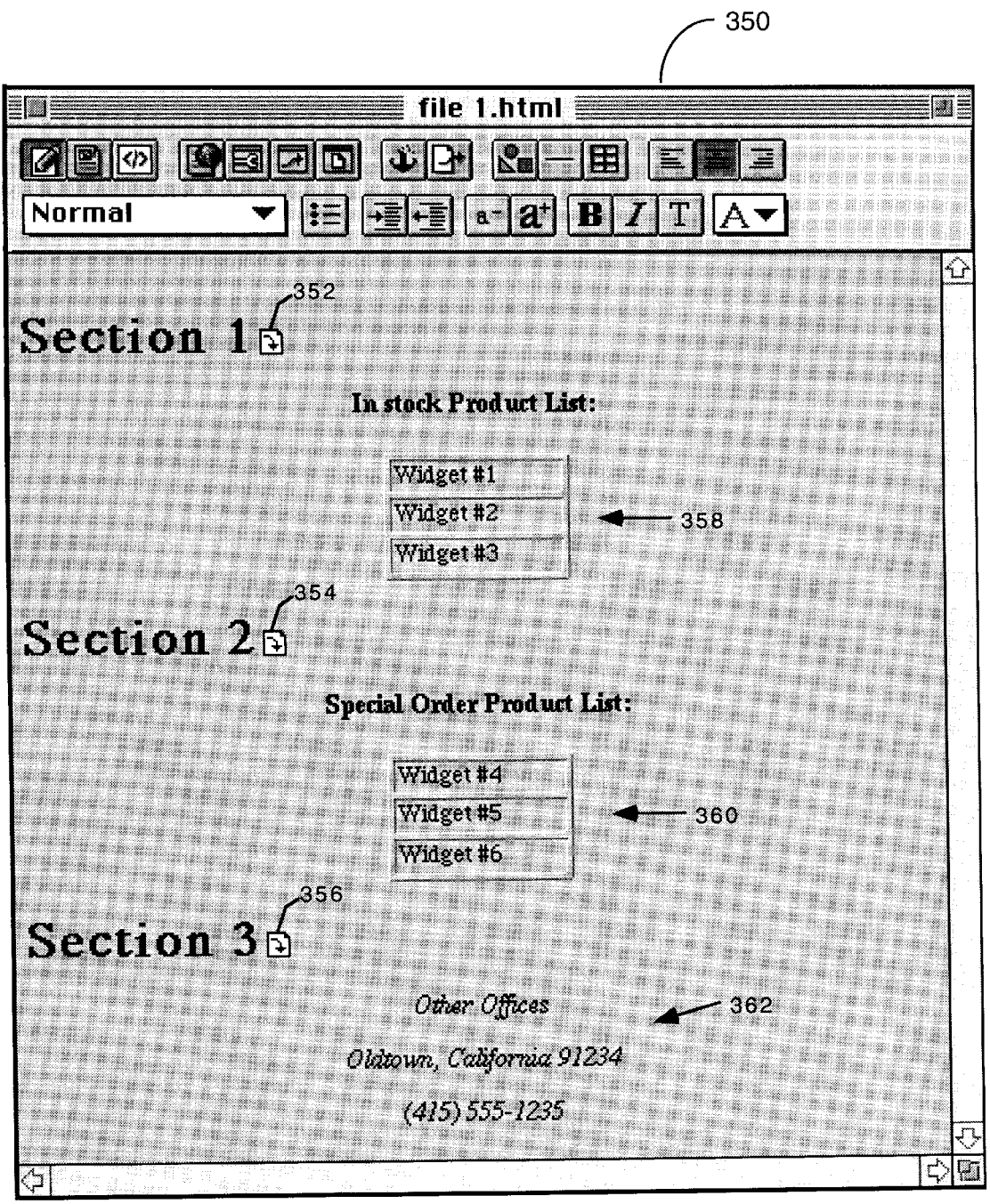
FIG. 4 is another exemplary screen shot of an H TML file that may be part of ABC Company's web site in accordance with one embodiment of the present invention.

FIG. 4 is another exemplary screen shot of an HTML file that may be part of ABC Company's web site in accordance with one embodiment of the present invention. As shown, file 1.html 350 is divided into three sections that contain previously defined anchors 352, 354, and 356. As well known to those skilled in the art, anchors are used so that links may be established to predefined sections within an HTML file such as those shown in file1.html 350.

In this example, Section 1 has ABC Company's "In Stock Product List" 358 that contains a list of widget #1, widget #2, and widget #3. Also shown is Section 2 that has ABC Company's "Special Order Product List" 360 that contains a list of widget #4, widget #5, and widget #6. And finally, Section 3 has ABC Company's "Other Offices" and the corresponding address 362. As illustrated, Section 1, Section 2 and Section 3 have all been defined as anchors.

In one embodiment, anchor 352 may be created using icon button 316. Preferably, the word "Section 1" is first highlighted to designate it as selected, and then icon button 316 is selected with a simple mouse click or any other suitable selection means. Of course, anchors may also be set using a suitable pull-down menu from a menu bar.

Figure 5:
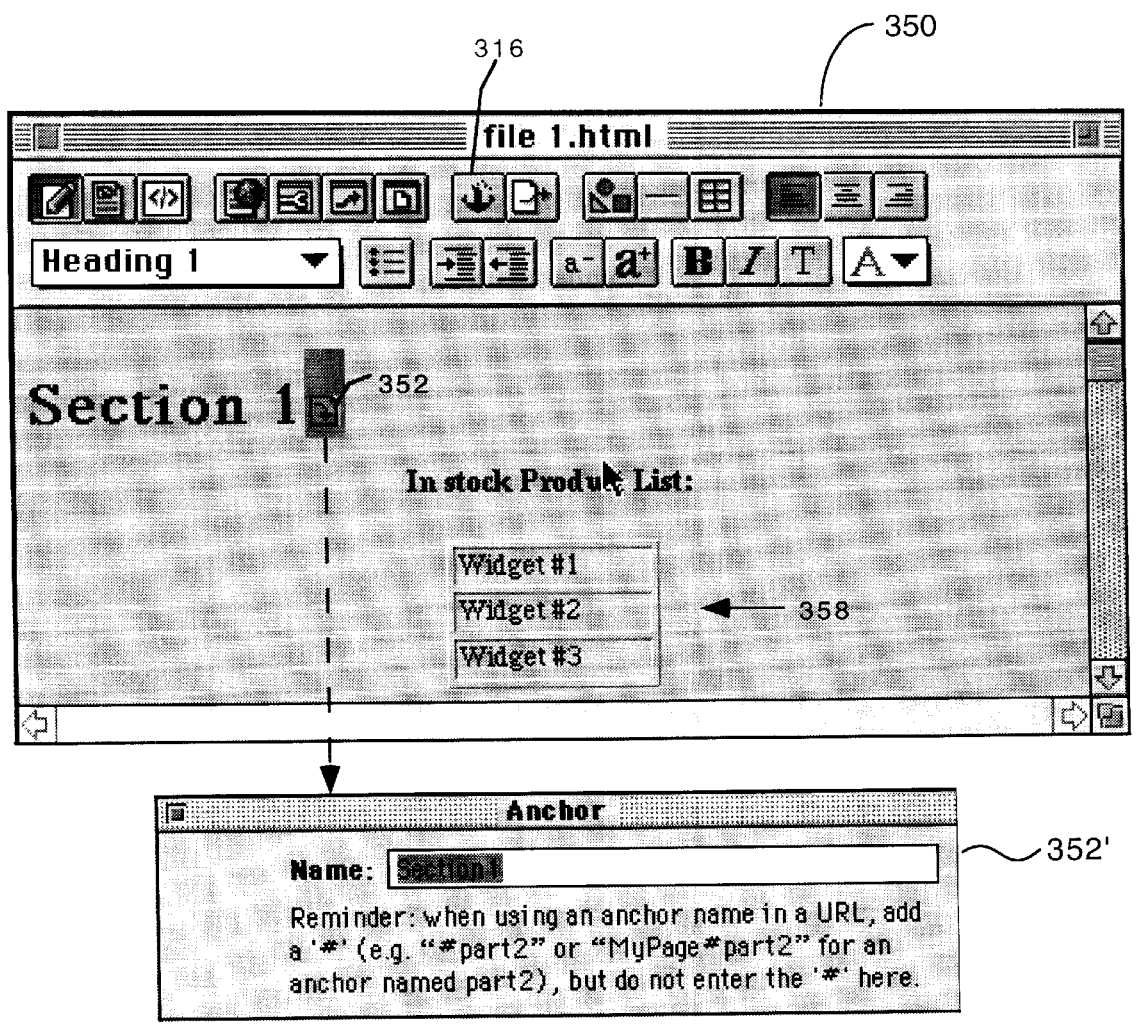
FIG. 5 is an exemplary screen shot a floating anchor window shown in accordance with one embodiment of the present invention.

As shown in FIG. 5, to verify that an anchor was indeed defined for Section 1, the downward pointing arrow which designates an anchor may be selected by, e.g., a double click. As shown, a floating window 352' labeled "Anchor" is displayed. Floating window 352' has the name of the created anchor as "Section 1," which verifies that an anchor was actually defined for Section 1. In this embodiment, floating window 352' also contains a reminder that informs the user that when using an anchor name in a URL, a "#" should be used as part of the name, however, it should not be entered at this field location.

Figure 6:
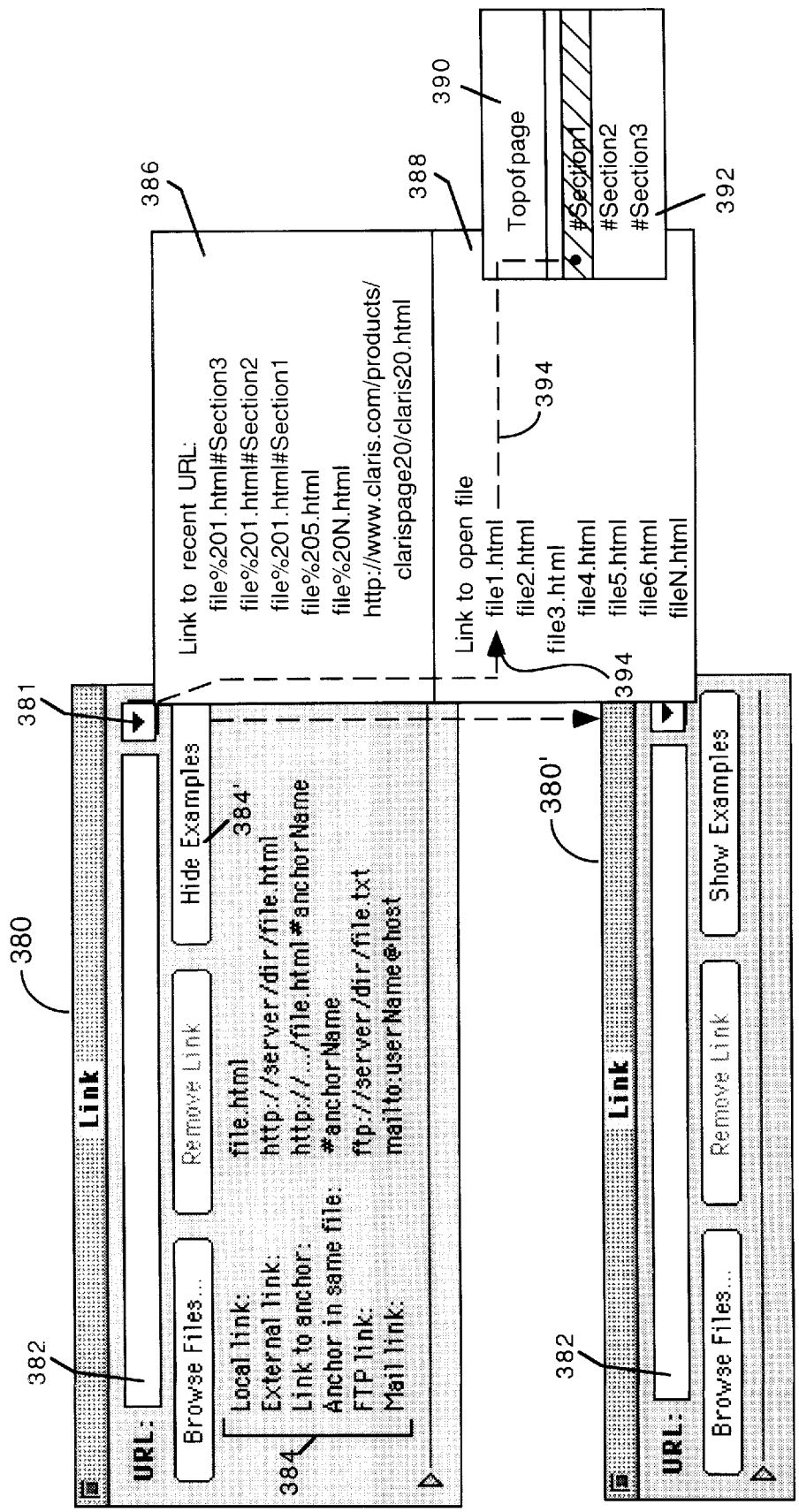
FIG. 6 is a graphical user interface illustration of a floating link editor containing a short-cut URL pop-up button in accordance with one embodiment of the present invention.

FIG. 6 is a graphical user interface illustration of a floating link editor 380 containing a short-cut URL pop-up button 381 in accordance with one embodiment of the present invention. As shown, floating link editor 380 contains a field 382 for manually typing in a desired URL address for a selected picture or text. By way of example, once a user selects a particular "text" such as "Products In Stock" 320 of FIG. 3, the user may then select link editor 312 from tool bars 301. Alternatively, the user may select "show link editor" from a "window" menu bar pull-down menu. Once the link editor is appropriately selected, floating link editor 380 will be displayed as shown in FIG. 6.

Thus, once "Products In Stock" 320 has been selected and floating link editor 380 has been displayed, the user may select floating link editor 380 with Examples 384 that provide a user with a "look-up reference list" for manually typing in URLs in field 382, or may select "Hide Examples" 384' to display a floating link editor 380' without examples 384. However, it should be understood that the functionality of floating link editor 380 and 380' are identical in nature.

Once "Products In Stock" 320 has been selected as described above, the user may select, with a selection pointer 393, short-cut URL icon button 381 by holding down the selection mouse clicker and navigating (i.e., sliding the mouse/pointer) through the various choices presented in a cascaded nested menu. By way of example, the user may select a URL link from a most recently used URLs section 386, or may select a link to an open files section 388. As described above, the list of open files may represent the active open files of FIG. 1 which correspond to a particular web site.

As described above, if the user wants to create a link to a selected anchor within an open file shown in open files section 388, the user may simply slide selection pointer 393 from short-cut URL icon button 381 down to an anchor defined within a selected open file. By way of example, the user may simply slide selection pointer 393 along a path 394 to select file 1.html and then select #Section 1 within an anchor list 392. In an other embodiment, because file1.html contains anchors, the user is preferably required to select either "top of page" 390 or an anchor from anchor list 392. On the other hand, if the open file selected from open files section 388 does not contain anchors, the nested window containing top of page 390 and anchor list 392 would preferably not be displayed.

Advantageously, creating links using floating link editor and short-cut URL icon button 381 is very efficient. As an example, once floating link editor is displayed, the user may effortlessly create links with one simple mouse click. Further, if the user frequently implements the same few URLs, the most recently used URLs section 386 provides an efficient manner for rapidly selecting a URL without having to manually type it in.

To illustrate the smart functionality of the most recently used URLs section 386, the status of the list before a selection is made following the exemplary path 394 is:

file%201.html#Section3
file%201.html#Section2
file%201.html#Section1
file%205.html
file%20N.html
http://www.claris.com/products/clarispage20/claris20.html Once the exemplary link is created by following path 394, the status of most recently used URLs section 386 will change. Preferably, the most recently used URL, which in this case is the newly created URL will now be "the most recently used" URL. Accordingly, the newly created URL will be displayed at the "top" of the list, and all other URLs will be shifted down as shown below:

file%201.html#Section1
file%201.html#Section3
file%201.html#Section2
file%205.html
file%20N.html
http://www.claris.com/products/clarispage20/claris20.html In the above example, the URL to Section 1 of file 1 was one that already existed, and therefore, it was shifted up to the top of the list from its previous placement in the list. However, if an entirely new URL was selected or created, an additional URL would be listed in the most recently used URL list 386 (i.e., at the top). As described above, a preferable number of URLs may be 10. Accordingly, if the list already included 10 and a brand new URL was created for the web site (or the open files), the oldest URL in the list would be discarded and the new URL would be displayed at the top of the list.

Another advantageous feature of this invention is that very long URLs that may be used throughout a web site need not be manually typed-in over and over again. By way of example, when a very long URL to the world wide web (e. g., http://www.claris.com/products/clarispage20/claris20.html) is frequently used, the user does not have to laboriously re-type or locate the URL in order to "copy/cut and paste" it into field 382 of floating link editor. In addition, once floating link editor has been selected and displayed on the screen, the user may access its advantageous functionalities during the entire web site creation, editing or updating session.

Figure 7:
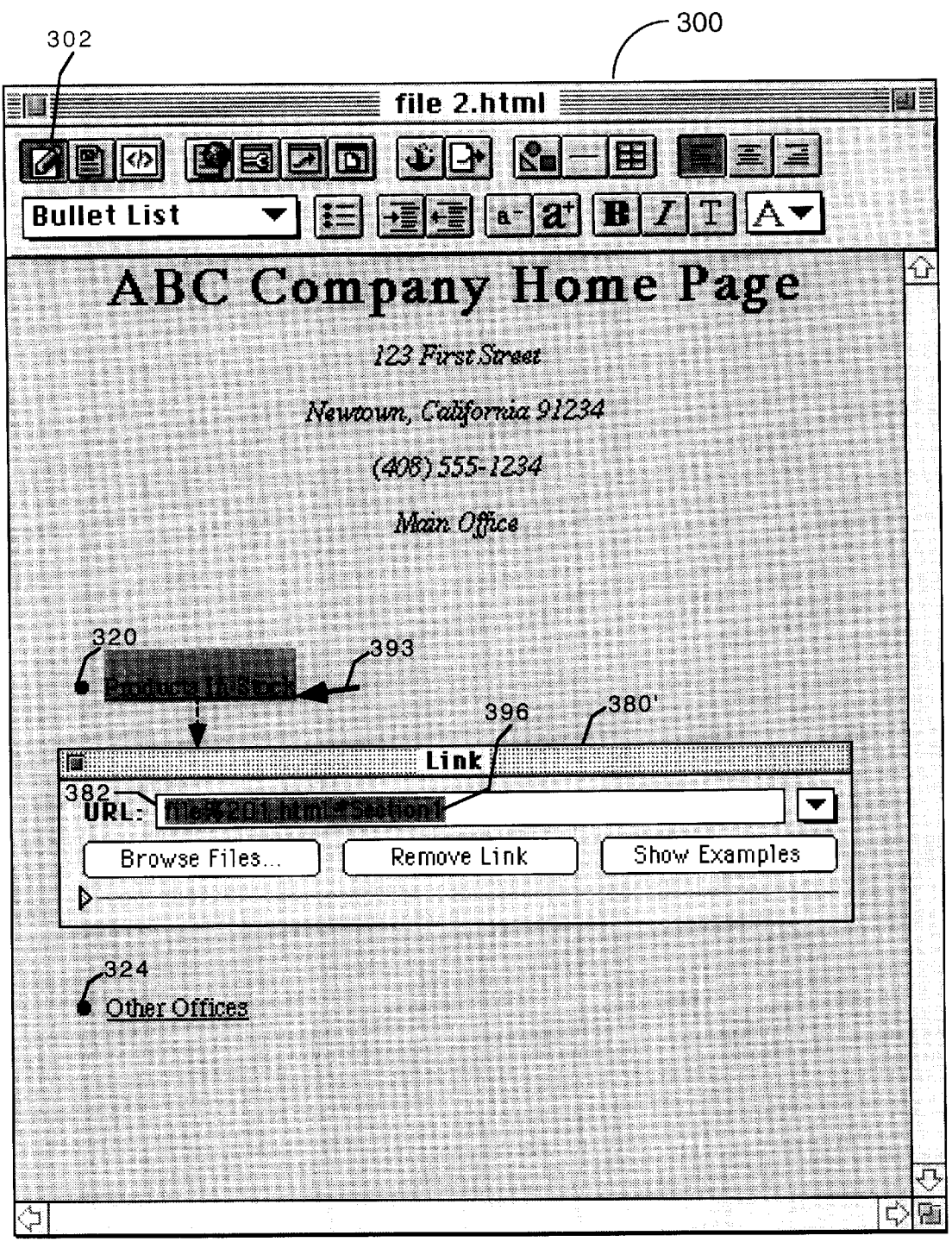
FIG. 7 is another graphical user interface illustration of a floating link editor in accordance with one embodiment of the present invention.

FIG. 7 is a graphical illustration of a floating link editor 380' containing a URL in accordance with one embodiment of the present invention. As shown, while floating link editor 380' is actively displayed on the screen, selection pointer 393 is used to double click on "Products In Stock" 320 while file2.html 300 is in edit page mode 302. After Products In Stock 320 is selected, the URL 396 previously created (i.e., using floating link editor as shown in FIG. 6) for "text" Products In Stock 320 is automatically displayed in field 382. Thus, the user may efficiently verify that the appropriate URL 396 was indeed created for the selected text. Although the illustrations above have concentrated on creating links from text, all of the above examples are equally applicable to creating links from pictures, graphics and any other objection on an HTML file.

FIG. 8 shows file2.html 300 once edit html source code button icon 306 is selected in accordance with one embodiment of the present invention. As shown, once the appropriate links are created using floating link editor 380, HTML source code 397 may be used to designate where links are allowed with file2.html 300. By way of example, the HTML link to Products In Stock 320 is shown as "<LI><A HREF=file%201.html#Section1">Products In Stock</A>." Although most beginning users may not actually edit the HTML source code, making the HTML source code easily accessible from the graphical user interface of file2.html 300 allows users experienced in HTML programming to freely modify or introduce new source code in the future.

The invention employs various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 9:
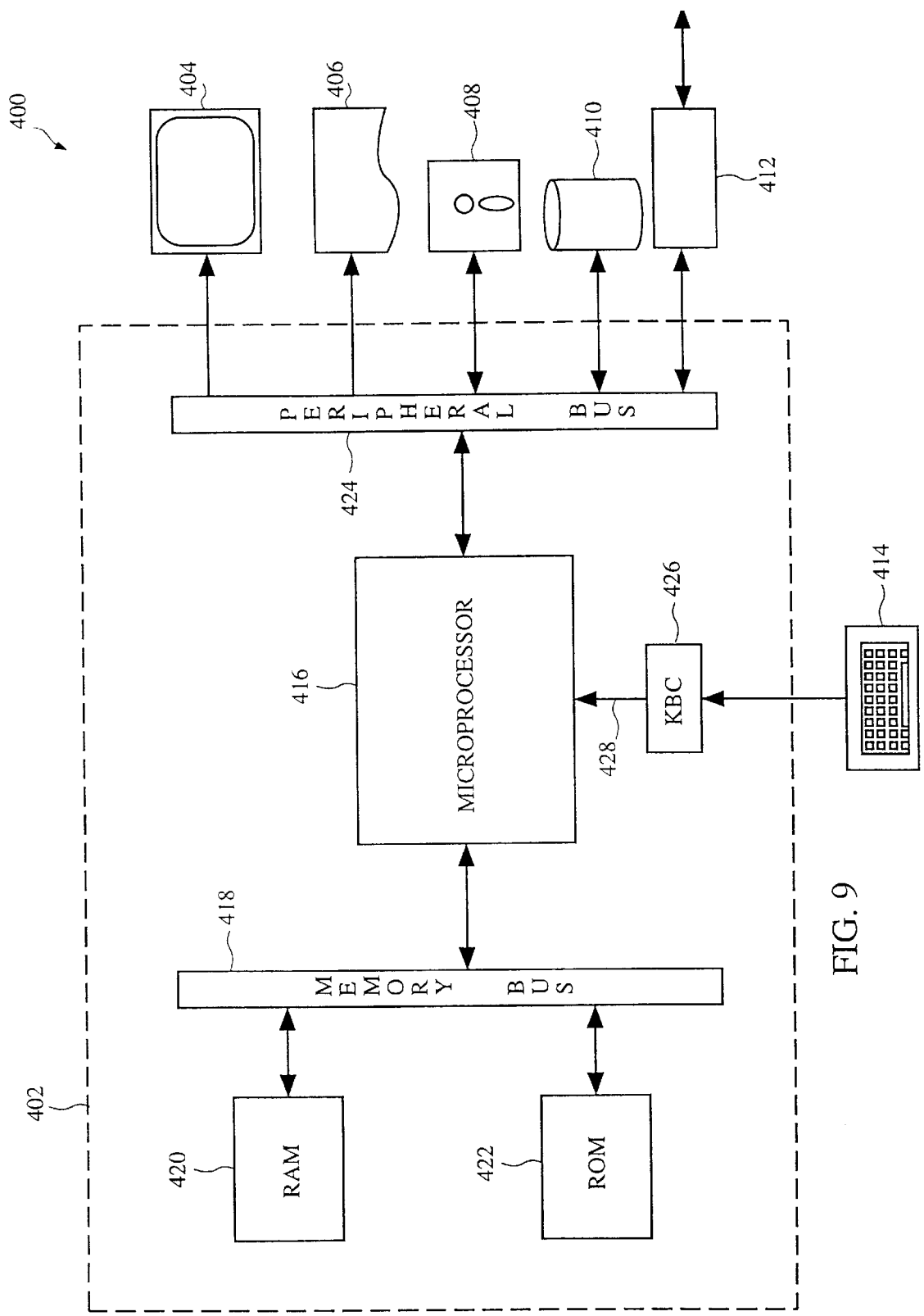
FIG. 9 is a block diagram of an exemplary computer system for carrying out the processing according to the invention.

FIG. 9 is a block diagram of an exemplary computer system 400 for carrying out the processing according to the invention. The computer system 400 includes a digital computer 402, a display screen (or monitor) 404, a printer 406, a floppy disk drive 408, a hard disk drive 410, a network interface 412, and a keyboard 414. The digital computer 402 includes a microprocessor 416, a memory bus 418, random access memory (RAM) 420, read only memory (ROM) 422, a peripheral bus 424, and a keyboard controller 426. The digital computer 400 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 416 is a general purpose digital processor which controls the operation of the computer system 400. The microprocessor 416 can be a single-chip processor or can be implemented with multiple components. Using instructions retrieved from memory, the microprocessor 416 controls the reception and manipulation of input data and the output and display of data on output devices. According to the invention, a particular function of microprocessor 416 is to assist in the processing the URL links, the floating link editor, and the menu data structures that form part of the cascaded nested menus.

The memory bus 418 is used by the microprocessor 416 to access the RAM 420 and the ROM 422. The RAM 420 is used by the microprocessor 416 as a general storage area and as scratch-pad memory, and can also be used to store input data and processed data. The ROM 422 can be used to store instructions or program code followed by the microprocessor 416 as well as other data.

The peripheral bus 424 is used to access the input, output, and storage devices used by the digital computer 402. In the described embodiment, these devices include the display screen 404, the printer device 406, the floppy disk drive 408, the hard disk drive 410, and the network interface 412. The keyboard controller 426 is used to receive input from keyboard 414 and send decoded symbols for each pressed key to microprocessor 416 over bus 428.

The display screen 404 is an output device that displays images of data provided by the microprocessor 416 via the peripheral bus 424 or provided by other components in the computer system 400. The printer device 406 when operating as a printer provides an image on a sheet of paper or a similar surface. Other output devices such as a plotter, typesetter, etc. can be used in place of, or in addition to, the printer device 406.

The floppy disk drive 408 and the hard disk drive 410 can be used to store various types of data. The floppy disk drive 408 facilitates transporting such data to other computer systems, and hard disk drive 410 permits fast access to large amounts of stored data.

The microprocessor 416 together with an operating system operate to execute computer code and produce and use data. The computer code and data may reside on the RAM 420, the ROM 422, or the hard disk drive 420. The computer code and data could also reside on a removable program medium and loaded or installed onto the computer system 400 when needed. Removable program mediums include, for example, CD-ROM, PC-CARD, floppy disk and magnetic tape.

The network interface 412 is used to send and receive data over a network connected to other computer systems. An interface card or similar device and appropriate software implemented by the microprocessor 416 can be used to connect the computer system 400 to an existing network and transfer data according to standard protocols.

The keyboard 414 is used by a user to input commands and other instructions to the computer system 400. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion. Although the foregoing invention has been described in some detail for purposes of clarity of understanding, it will be apparent that certain changes and modifications may be practiced within the scope of the appended claims. Further, the HTML files may be stored and retrieved from any suitable storage medium. By way of example, such storage mediums may include a disk drive, a hard drive, a floppy disk, a server computer, a remotely networked computer, etc. Accordingly, the present embodiments are to be considered as illustrative and not restrictive, and the invention is not to be limited to the details given herein, but may be modified within the scope and equivalents of the appended claims.

What is claimed is:

1. A method for generating universal resource locator links in a graphical user interface based HTML file, comprising the operations of:

selecting one of a picture object and text contained within the graphical user interface based HTML file;

selecting a short-cut universal resource locator icon;

displaying a nested menu in response to the selecting of the short-cut universal resource locator icon, the nested menu including a list of most recently used universal resource locators and a list of open HTML files, the list of most recently used universal resource locators including at least one universal resource locator, and the list of open HTML files including at least one HTML file, and the nested menu further including a sub-menu containing at least one anchor reference that is associated with at least one open HTML file from the list of open HTML files;

selecting from the nested menu one of the universal resource locators from the list of most recently used universal resource locators and the open HTML file from the list of open HTML files; and generating a link from the selected one of the picture object and text contained within the graphical user interface based HTML file to one of the selected universal resource locators from the list of most recently used universal resource locators and the open HTML file from the list of open HTML files.

2. A method for generating universal resource locator links in a graphical user interface based HTML file as recited in claim 1, further comprising the operation of:

selecting the at least one anchor reference when the at least one open HTML file from the list of open HTML files is selected; and generating a link from the selected one of the picture object and text contained within the graphical user interface based HTML file to the selected at least one anchor reference.

3. A method for generating universal resource locator links in a graphical user interface based HTML file as recited in claim 2, wherein the operation of generating the link from the selected one of the picture object and text contained within the graphical user interface based HTML file to the selected at least one anchor reference is performed in a single selection mouse click from the short-cut universal resource locator icon to the selected at least one anchor reference.

4. A method for generating universal resource locator links in a graphical user interface based HTML file as recited in claim 1, wherein the short-cut universal resource locator icon is contained within a floating link editor.

5. A method for generating universal resource locator links in a graphical user interface based HTML file as recited in claim 4, wherein the floating link editor remains active when the graphical user interface based HTML file is being created and modified.

6. A method for generating universal resource locator links in a graphical user interface based HTML file as recited in claim 5, wherein the floating link editor is displayed in a functional graphical user interface.

7. A method for generating universal resource locator links in a graphical user interface based HTML file as recited in claim 6, wherein the displayed functional graphical user interface includes a manual type-in universal resource locator field.

8. A method for generating universal resource locator links in a graphical user interface based HTML file as recited in claim 1, wherein the list of most recently used universal resource locators contains universal resource locators selected from the group consisting of local links, external links, anchor links, FTP links, and mail links.

9. A method for generating universal resource locator links in a graphical user interface based HTML file as recited in claim 1, further comprising the operations of:

updating the list of most recently used universal resource locators each time a universal resource locator is used; and displaying a most recently used universal resource locator first, such that the most recently used universal resource locator is before a previously most recently used universal resource locator.

10. A computer readable media containing program instructions for generating universal resource locator links in a graphical user interface based HTML file, said computer readable media comprising:

program instructions for selecting one of a picture object and text contained within the graphical user interface based HTML file;

program instructions for displaying a menu, the menu including a list of open HTML files, the list of open HTML files including at least one HTML file, and the menu further including a sub-menu containing at least one anchor reference that is associated with at least one open HTML file from the list of open HTML files;

program instructions for selecting from the menu one of the open HTML files from the list of open HTML files; and program instructions for generating a link from the selected one of the picture object and text contained within the graphical user interface based HTML file to the selected one of the open HTML files from the list of open HTML files.

11. A computer readable media containing program instructions for generating universal resource locator links in a graphical user interface based HTML file, said computer readable media comprising:

program instructions for selecting one of a picture object and text contained within the graphical user interface based HTML file;

program instructions for displaying a menu, the menu containing a list of most recently used universal resource locators, the list of most recently used universal resource locators including at least one anchor-type universal resource locator, the anchor-type universal resource locator pertaining to a base HTML file and an anchor reference within the base HTML file;

program instructions for selecting from the menu one of the universal resource locators from the list of most recently used universal resource locators; and program instructions for generating a link from the selected one of the picture object and text contained within the graphical user interface based HTML file to the selected universal resource locators from the list of most recently used universal resource locators.

12. A method for generating universal resource locator links in a graphical user interface based HTML file as recited in claim 1, wherein the list of the most recently used universal resource locators includes at least one external universal resource locator.

13. A method for generating universal resource locator links in a graphical user interface based HTML file as recited in claim 1, wherein the list of most recently used universal resource locators is updated each time a universal resource locator is used.

14. A computer readable media containing program instructions for generating universal resource locator links in a graphical user interface based HTML file, said computer readable media comprising:

program instructions for selecting one of a picture object and text contained within the graphical user interface based HTML file;

program instructions for displaying a menu, the menu containing a list of most recently used universal resource locators, the list of the most recently used universal resource locators including at least one anchor-type universal resource locator, the anchor-type universal resource locator pertaining to a base HTML file and an anchor reference within the base HTML file;

program instructions for selecting from the menu one universal resource locator from the list of most recently used universal resource locators; and program instructions for generating a link from the selected universal resource locator from the list most recently used universal resource locators.

15. A computer readable program as recited in claim 14, wherein the list of the most recently used universal resource locators includes at least one external universal resource locator.

16. A computer readable program as recited in claim 14, wherein the list of the most recently used universal resource locators includes a least one external universal resource locator, and wherein the list of most recently used universal resource locators is updated each time a universal resource locator is used.

17. A computer readable media containing program instructions for generating universal resource locator links in a graphical user interface based HTML file, said computer readable media comprising:

program instructions for selecting one of a picture object and text contained within the graphical user interface based HTML file;

program instructions for displaying a menu, the menu including a list of open HTML files, the list of open HTML files including at least one open HTML file, and the menu further containing at least one anchor reference that is associated with the at least one open HTML file;

program instructions for selecting from the menu one of the open HTML files from the list of open HTML files; and program instructions for generating a link from the selected one of the picture object and text contained within the graphical user interface based HTML file to the selected one of the open HTML files from the list of open HTML files.

18. A computer readable program as recited in claim 17, wherein said computer readable medium further comprises program instructions for selecting from the menu the at least one anchor reference, and wherein said program instructions for generating a link operate to generate the link from the selected one of the picture object and text contained within the graphical user interface based HTML file to the selected anchor reference within the sub-menu of the selected one of the open HTML files within the menu.

* * * * *